United States Patent [19]

Dei

[11] Patent Number: 5,729,714
[45] Date of Patent: Mar. 17, 1998

[54] SHARED MEMORY ACCESS METHOD AND APPARATUS WITH ADDRESS TRANSLATION

[75] Inventor: Katsuhito Dei, Yokohama, Japan

[73] Assignee: Canon Kabushiki Kaisha, Tokyo, Japan

[21] Appl. No.: 465,194

[22] Filed: Jun. 5, 1995

Related U.S. Application Data

[63] Continuation of Ser. No. 827,435, Jan. 29, 1992, abandoned.

[30] Foreign Application Priority Data

Feb. 1, 1991 [JP] Japan ................... 3-011967

[51] Int. Cl.$^6$ .................................................. G06F 12/08
[52] U.S. Cl. .................................................. 395/474
[58] Field of Search ............................. 395/403, 457, 395/474, 476, 497.04

[56] References Cited

U.S. PATENT DOCUMENTS

| | | | |
|---|---|---|---|
| 4,797,814 | 1/1989 | Brenza | 395/425 |
| 4,843,542 | 6/1989 | Dashiell et al. | 364/200 |
| 4,928,224 | 5/1990 | Zulian | 364/200 |
| 4,980,822 | 12/1990 | Brantley, Jr. et al. | 395/400 |
| 5,018,063 | 5/1991 | Liu | 395/375 |
| 5,023,776 | 6/1991 | Gregor | 395/449 |
| 5,091,845 | 2/1992 | Rubinfeld | 395/425 |
| 5,113,514 | 5/1992 | Albonesi et al. | 395/425 |
| 5,117,350 | 5/1992 | Parrish et al. | 395/425 |
| 5,251,308 | 10/1993 | Frank et al. | 395/490 |
| 5,257,361 | 10/1993 | Doi et al. | 395/425 |

FOREIGN PATENT DOCUMENTS

| | | |
|---|---|---|
| 0179401 | 4/1986 | European Pat. Off. . |
| 0387644 | 9/1990 | European Pat. Off. . |
| 2221066 | 1/1990 | United Kingdom . |
| 9007154 | 6/1990 | WIPO . |

OTHER PUBLICATIONS

"A Communication Structure for a Multiprocessor Computer with Distributed Global Memory," L. Philipson et al., International Symposium on Computer Architecture, Washington, IEEE Comp. Soc. Press, 1983, pp. 334–340.

*Primary Examiner*—David L. Robertson
*Attorney, Agent, or Firm*—Fitzpatrick, Cella, Harper & Scinto

[57] ABSTRACT

A processing apparatus in a system in which a plurality of processing apparatuses are interconnected via a transmission medium. The apparatus includes a processor for requesting an access by outputting a virtual address, a local memory connected to the processor without an intermediary of the transmission medium and a first address convertor for converting the virtual address from the processor into a first real address for accessing the local memory. A second address convertor converts the virtual address from the processor into a first intermediate address, and outputs the first intermediate address to the transmission medium. A third address convertor converts a second intermediate address brought via the transmission medium to the processing apparatus from another one of the plurality of processing apparatuses, into a second real address for accessing the local memory.

17 Claims, 5 Drawing Sheets

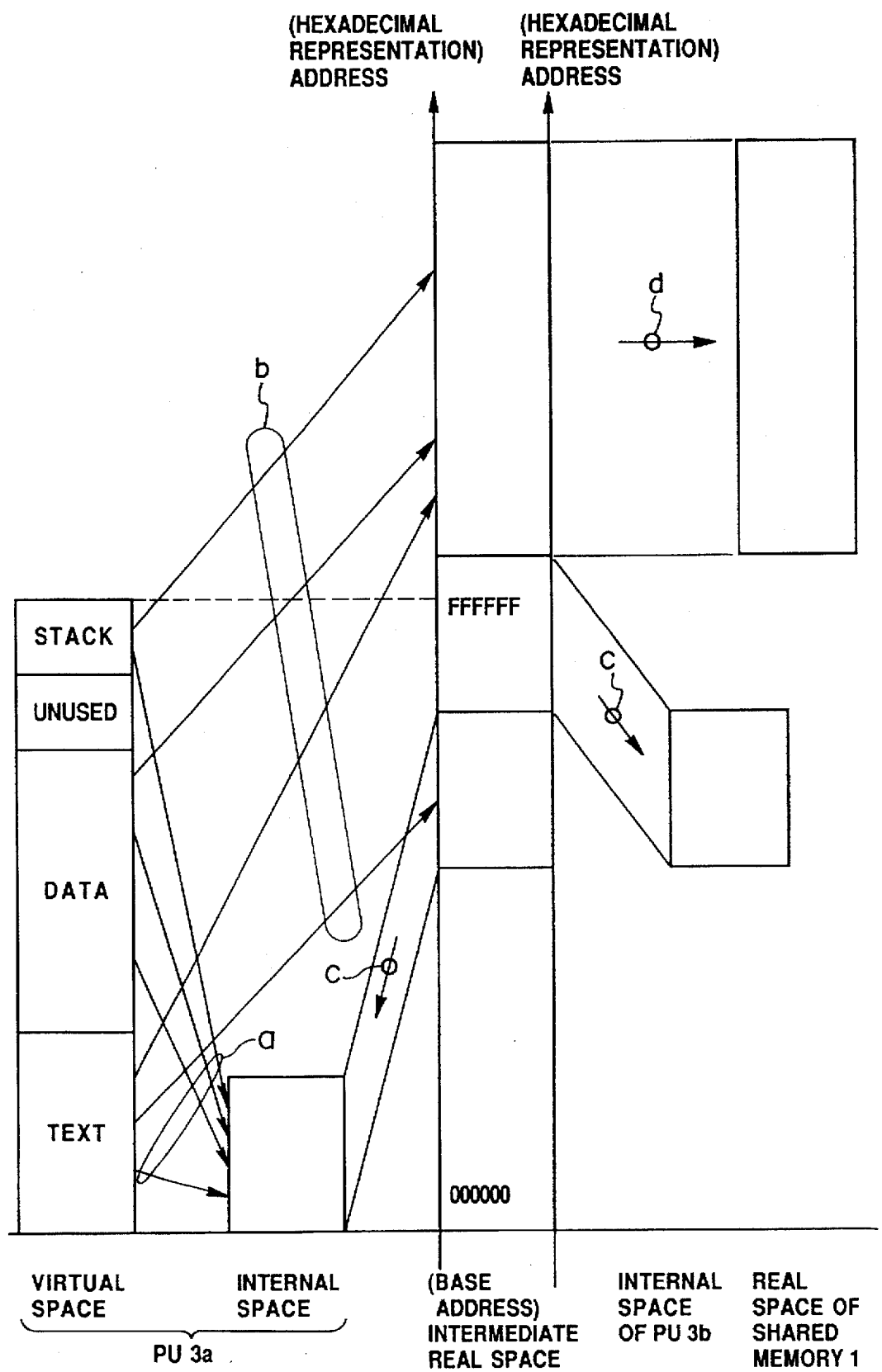
F I G. 2

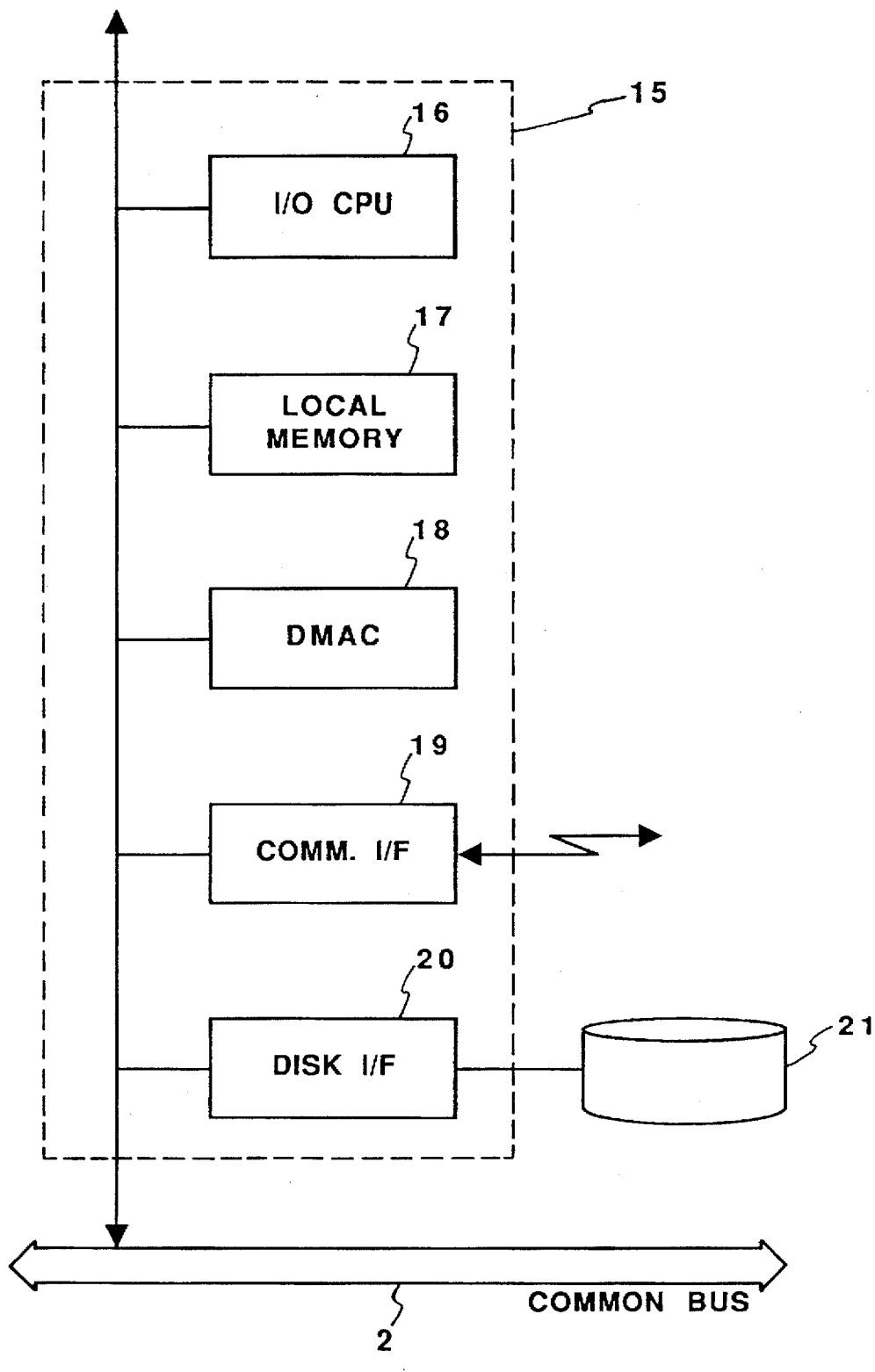
F I G. 5

SHARED MEMORY ACCESS METHOD AND APPARATUS WITH ADDRESS TRANSLATION

This application is a continuation of application Ser. No. 07/827,435, filed Jan. 29, 1992, now abandoned.

BACKGROUND OF THE INVENTION

1. Field of the Invention

This invention relates to a memory access method and apparatus and, more particularly, to a memory access method and apparatus used in a multiprocessor system.

2. Description of the Prior Art

In the prior art, a multiprocessor system (hereinafter referred to simply as "the system") generally possesses a configuration having a shared memory accessed from all of the processors or a configuration in which local memories dedicated to respective processors are provided in addition to the shared memory in order to raise processing efficiency. The shared memory is of a centralized configuration, in which the entirety of the memory is centralized in one memory unit, a decentralized configuration, in which the shared memory is decentralized among a plurality of memory units corresponding to the respective processors, or a configuration intermediate the two mentioned above.

However, in the system wherein the shared memory is centralized, memory access conflict among the plurality of processors occurs and processing efficiency declines since the system bus and memory cannot cope with the conflict. In order to solve this problem, the general practice is to use a system in which a local memory dedicated to each processor is added to each processor. However, since a local memory dedicated to one processor cannot be accessed by another processor, a problem which arises is that common data cannot be stored in the local memory. Even if common data is stored in a local memory, interprocessor communication would need to be performed frequently in order to maintain consistency with common data that may be present in the local memory dedicated to another processor. This would give rise to another problem, namely the fact that the system would be subjected to an excessive load.

In the case where the shared memory is decentralized, there are many instances in which a processor and a memory are paired together as a single unit [hereinafter referred to as a "PU" (processor unit)]. Each PU is provided with a unit number (hereinafter referred to as a "PU-ID"), and a shared-memory address of the system is decided from the PU-ID and the memory address within the PU so that memory access conflict will not occur between PUs. In other words, at system start-up, the memories are arranged in accordance with the system configuration in such a manner that an address of the shared memory will be an address shared by the entire system. However, with a system configuration of this kind, a drawback is that if addresses run consecutively in the entirety of the memory in a system composed of, say, eight PUs, a malfunction in one PU will cause a discontinuity to occur in the physical memory space. This will make it necessary to re-configure or restart the system. In addition, management of the shared memory becomes more complicated.

Furthermore, in a case where an external unit such as a disk storage unit is connected to the system and a large quantity of information is exchanged, even more complicated memory management becomes necessary.

SUMMARY OF THE INVENTION

Accordingly, it is an object of the present invention to provide a memory access method in a multiprocessor system wherein each processor is capable of accessing the local memories of other processors and accessing of an external unit or shared memory is capable of being performed more efficiently.

According to the present invention, the foregoing object is attained by providing a memory access method in a system in which a plurality of processors are interconnected via a common transmission medium and each of the plurality of processors has a local memory medium connected to it without the intermediary of the common transmission medium, the method comprising a first address converting step of converting an address from a first processor among the plurality of processors into an address for accessing the local memory medium possessed by the first processor, a second address converting step of converting an address from the first processor into an address for transmission to the transmission medium, and a third address converting step of converting addresses brought via the transmission medium to the first processor from another one of the plurality of processors, into addresses for accessing the local memory medium possessed by the first processor.

Another object of the present invention is to provide a memory apparatus in a multiprocessor system wherein each processor is capable of accessing local memories of other processors and accessing of an external unit or shared memory is capable of being performed more efficiently.

According to the present invention, the foregoing object is attained by providing a memory apparatus in a system in which a plurality of processors are interconnected via a common transmission medium, the apparatus comprising local memory means connected to each of the plurality of processors without the intermediary of the common transmission medium, first address converting means for converting an address from a first processor among the plurality of processors into an address for accessing the local memory means possessed by the first processor, second address converting means for converting an address from the first processor into an address for transmission to the transmission medium, and third address converting means for converting addresses brought via the transmission medium to the first processor from another one of the plurality of processors, into addresses for accessing the local memory means possessed by the first processor.

In accordance with the present invention as described above, each processor accesses its own local memory means via the first address converting means and accesses the local memory means possessed by the other processors via the common transmission medium as well as the second and third address converting means.

The invention is particularly advantageous since the accessing of an external unit, such as a shared memory or disk storage unit, by each processor unit can be executed using the address space shared by the system. This simplifies address-space management.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram showing the mapping of address space;

FIG. 5 is a block diagram showing the configuration of an I/O processor subsystem.

DESCRIPTION OF THE PREFERRED EMBODIMENTS

Preferred embodiments of the present invention will now be described in detail with reference to the accompanying drawings.

Figure 1:
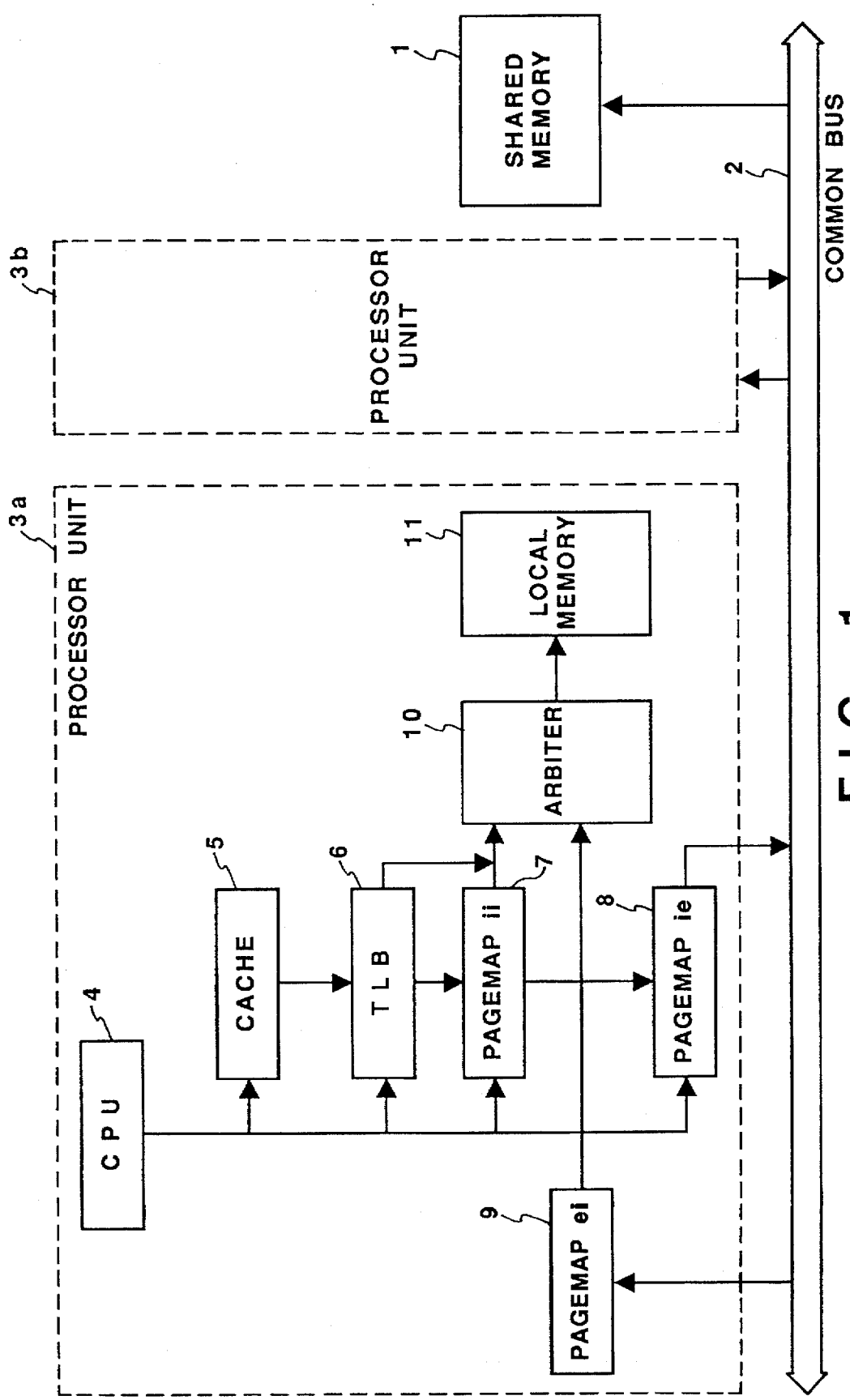
FIG. 1 is a block diagram illustrating the configuration of a multiprocessor system according to a typical embodiment of the present invention.

FIG. 1 is a block diagram illustrating the configuration of a multiprocessor system according to a typical embodiment of the present invention. The system shown in FIG. 1 includes a shared memory 1 accessed from each processor, a common bus 2 to which each processor unit (hereinafter referred to as a "PU"), the shared memory 1 and an I/O system (not shown) are connected, and PUs 3a, 3b. Each PU comprises a CPU 4, a cache memory (hereinafter referred to simply as a "cache") 5, a translation lookaside buffer (hereinafter referred to as a "TLB") 6, a page map ii 7, which converts a virtual address into a local memory address (hereinafter referred to as an "internal address"), a page map ie 8 for converting a virtual address into an intermediate address shared by the system, a page map ei 9 for converting the intermediate address shared by the system into an internal address, an arbiter 10 for arbitrating memory access generated by a request from within the PU and memory access generated by a request from outside, and a local memory 11 to which other PUs are capable of referring.

It is assumed that the cache 5 includes units, such as a cache tag and comparator, that are necessary to construct a cache system. In this embodiment, the arrangement is such that the cache 5 is externally mounted on the CPU 4. However, it is also possible to use a cache-integrated CPU.

A virtual address issued by the CPU 4 is applied to the cache 5, the TLB 6, the page map ii 7 and the page map ie 8. The virtual address issued by the CPU 4 is then discriminated by the cache 5 to determine whether there is a hit in the cache 5. If there is a hit in the cache 5, the address conversion by the TLB 6, page map ii 7 and page map ie 8 is halted and the data constituting the hit is transferred to the CPU 4. When there is a write hit, information in accordance with a cache coherency protocol is transmitted to the common bus 2.

On the other hand, if there is no cache hit in the cache 5, whether or not the virtual address is present in the local memory 11 is determined by the TLB 6, which possesses the internal address thereof. If the TLB 6 has an entry corresponding to the virtual address, the virtual address is converted into an internal address by the TLB 6, and the internal address is applied to the local memory 11 via the arbiter 10.

At this time, the page map ii 7 is informed of the foregoing simultaneously and the address conversion to the internal address is inhibited. Furthermore, the page map ie 8 is similarly informed, and the address conversion by the page map ie 8 is inhibited.

In a case where an entry corresponding to the virtual address does not exist in the entry of TLB 6, address conversion is carried out using the page map ii 7. This conversion can be executed in hardware fashion by a memory management unit (MMU) or in software fashion via the CPU 4.

FIG. 2 is a diagram showing the state of address mapping in this embodiment. In FIG. 2, virtual space is mapped based upon a 24 bit addressing architecture.

FIG. 2 illustrates, in order from the left side, the address mapping of each of the following: the virtual space of a process currently being executed by the PU 3a, the internal space (the address space of local memory 11) of PU 3a, an intermediate real space, the internal space (the address space of the local memory of PU 3b) of PU 3b, and the real space of the shared memory 1. In accordance with FIG. 2, the arrow group a illustrates that several portions of the virtual space address of the process being executed by the PU 3a are mapped to the internal space corresponding to the local memory 11 of PU 3a. The arrow group a indicates that an address conversion is being carried out between the virtual space and the internal space via the TLB 6 or page map ii 7.

The page map ie 8 maps the virtual space of the process currently being executed by the CPU 4 to the intermediate space shared by the entire system. The local memory in each PU, the shared memory 1 and the I/O space of the I/O system (not shown) are mapped in the intermediate real space. As illustrated by the arrow group b in FIG. 2, the virtual space addresses and the other spaces of the process being executed by the PU 3a are mapped as consecutive addresses in the intermediate real space by the action of the page map ie 8.

Thus, if a virtual address issued by the CPU 4 does not exist in the local memory 11, the local address is converted into an address in the intermediate real space through the page map ie 8, and the intermediate real address is outputted on the common bus 2, which is external to the PU 3a, for the first time.

The intermediate real address outputted on the common bus 2 is accepted by the shared memory 1 or by another CPU. This is indicated by arrow groups c and d in FIG. 2. The arrow group c indicates that the intermediate real space is mapped in the local memory of each PU (PUs 3a and 3b in this example) by the action of the page map ei 9. The arrow group d indicates that the real space addresses of the shared memory 1 are treated as having the same addresses as the intermediate realspace addresses.

First, a case will be described in which an area of a portion corresponding to an address of the shared memory 1 exists in the shared memory.

The virtual address issued by the CPU 4 is converted by the page map ie 8 into an intermediate real-space address which indicates an area determined by the space mapped by the shared memory 1 in the intermediate real space. The intermediate real-space address is applied to the shared memory 1 through the common bus 2.

Next, a case will be considered in which the area of a portion corresponding to a virtual address issued by a certain PU exists in the local memory of another PU (PU 3b in this example).

In a manner similar to that of the local memory 11 of PU 3a, the local memory of PU 3b is mapped in the intermediate real space by the page map ei contained in the PU 3b. Accordingly, addresses mapped in the intermediate real space by the page map ei of the PU 3b are prepared beforehand in the page map ie 8 of PU 3a. Under these conditions, a virtual address generated by the CPU 4 is converted by the page map ie 8 of the PU 3a into an intermediate real-space address which indicates an area determined by the space mapped by the PU 3b in the intermediate real space. The intermediate real-space address is applied to the PU 3b through the common bus 2. On the other hand, in the page map ei of PU 3b, the applied intermediate real-space address is converted into an internal address of PU 3b and applied to the local memory. Thus, the local memory of the PU 3b can be accessed via the page map ie 8 of PU 3a and the page map ei of PU 3b by the virtual address issued by PU 3a.

As described above, the local memory 11 is accessed through the three paths constituted by the TLB 6, the page map ii 7 and the page map ei 9. However, since access from the TLB 6 and page map ii 7 is generated exclusively, the local memory 11 has an access path from within the PU through the TLB 6 or page map ii 7 and an access path from the outside by means of the page map ei 9.

In this embodiment, the arbiter 10 is used so as to give precedence to access from within the PU. Even if external accessing is in progress, internal accessing is executed preferentially by application of an interrupt immediately after the conclusion of the current cycle. Then, when the internal accessing operation ends, access priority to the local memory is controlled in such a manner that external accessing is resumed.

Therefore, in accordance with this embodiment, the shared memory 1 and the local memory of the PU 3b can be accessed by preparing beforehand, in the page map ie 8 of the PU 3a, the address indicating the area determined by the space mapped by the shared memory 1 and the address indicating the intermediate space mapped by the local memory (not shown) of the PU 3b. Furthermore, by arranging it so that access to a local memory from its own processor is given precedence over access from other processors, a decline in processing efficiency within the processor of this local memory can be prevented.

[Other Embodiments]

In the foregoing embodiment, it has been described that in order to map a shared memory to an address the same as that of the intermediate real space and effect an address conversion from the intermediate real space to the internal space of each PU, only the base address of each area is shifted and each of the areas are themselves mapped as continuous address spaces. In this embodiment, an example will be described in which a separate page map is placed between the shared memory and the common bus, whereby an intermediate real space is handled for every predetermined small processing unit (hereinafter referred to as a "page") and any intermediate real space is mapped to a real space of the shared memory or the internal space of each PU on a unit by unit basis. Also, an example will be described in which information is exchanged with an external unit such as a disk storage unit.

In this embodiment, an apparatus having the same construction as that of the memory access apparatus used in the first embodiment is employed except for the fact that a separate page map is provided between the shared memory and the common bus or the fact that an input/output processor connected to the common bus is provided in order to perform an information exchange with an external unit. Accordingly, reference characters identical with those shown in FIG. 1 are used and a description of elements similar to those in the first embodiment is deleted.

First, a case will be described in which a shared memory having its own page map (local page map) is connected to the common bus.

Figure 3:
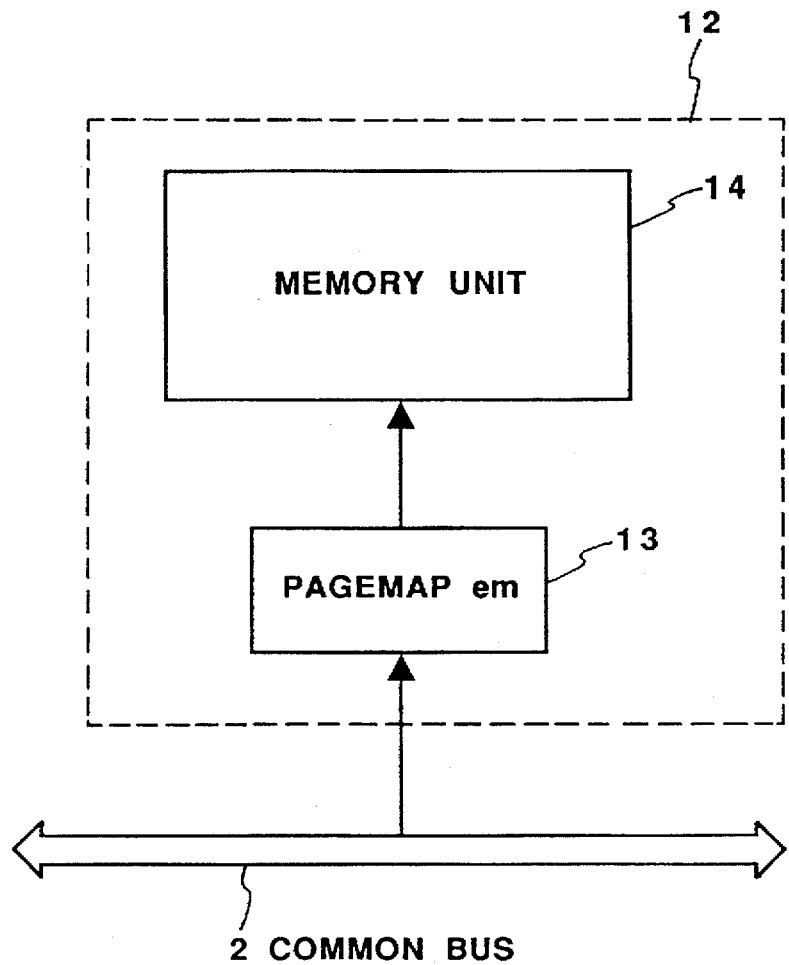
FIG. 3 is a block diagram showing the configuration of a shared memory according to another embodiment.

FIG. 3 is a diagram showing the configuration of a shared memory 12 used in this embodiment. Here a page map em 13 is provided between a memory unit 14 and the common bus 2. In order to access the memory unit 14, the intermediate real address on the common bus 2 is converted into an internal address of the memory unit 14 by the page map em 13.

Figure 4:
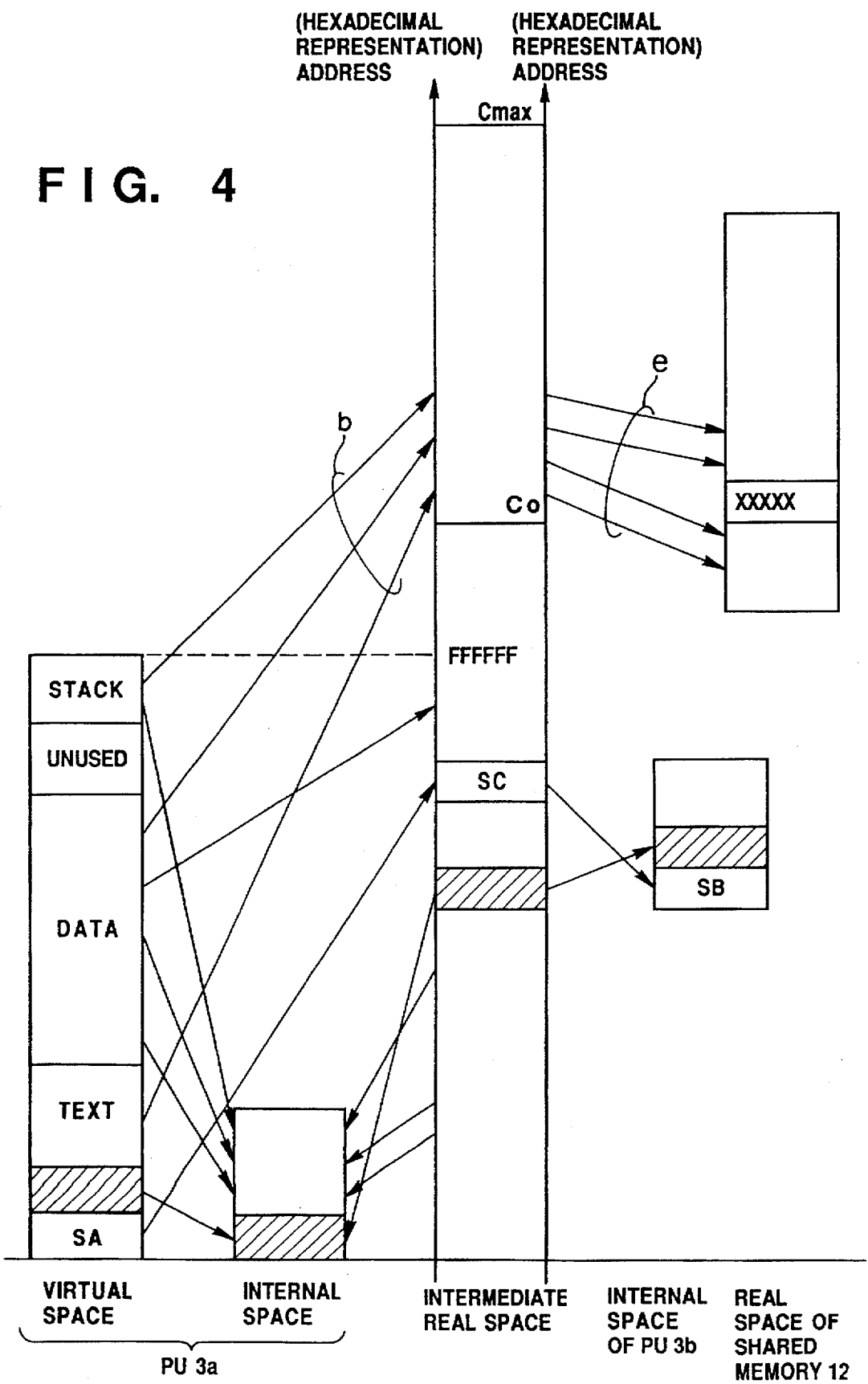
FIG. 4 is a diagram showing the mapping of address space according to this embodiment.

FIG. 4 is a diagram showing the mapping of an address space according this embodiment. Reference will be had to FIG. 4 to describe a case in which a process being executed by the PU 3a accesses the shared memory 12 and a case in which this process accesses the local memory of the PU 3b.

First, the page of the virtual space of the process being executed by the PU 3a is address-converted by the page map ie 8 into an area of intermediate real-space addresses $C_0 \sim C_{max}$. Next, the intermediate real-space addresses are converted into internal addresses of the memory unit 14 by the page map em 13 within the shared memory 12. At this time the conversion to the internal addresses of the memory unit 14 is executed in page units. Therefore, if consecutive addresses exist in the memory unit 14 in page-size units, the address conversion will be executed correctly. Accordingly, even if a malfunction occurs in part of the shared memory 12 and accessing become impossible (i.e., even if a malfunction occurs at a location indicated by "xxxxx" in the memory space of the shared memory in FIG. 4), the intermediate real space can be mapped without using this location.

Next, a case will be described in which the local memory of the PU 3b is accessed.

First, the address of a page (SA) which is part of the text of a process being executed by the PU 3a shown in FIG. 4 is converted into an address of an area (SC) in the intermediate real space by means of an address conversion performed by the page map ie 8. Next, the area SC is mapped to an area (SB), which is in the local memory of the PU 3b, by the page map ei of the PU 3b. In this embodiment, the page which is the portion of the process being executed by the PU 3a, particularly the shared area for process execution, is mapped to the respective internal spaces of the PU 3a and PU 3b, as indicated by the hatched areas in FIG. 4. As a result, use is made of the internal memories, which are capable of high-speed response.

A case will now be described in which information is exchanged with an external unit.

In a computer system, processing for input/output with an external unit such as a disk storage unit often is executed to achieve transfer of a large quantity of data between the disk and a memory.

A case will be considered in which an I/O processor subsystem 15 having a construction of the kind shown in FIG. 5 is connected to the system of FIG. 1 through the common bus 2. The I/O processor subsystem 15 (hereinafter referred to as an "I/O processor") comprises an I/O processor-dedicated CPU (hereinafter referred to as an "I/O CPU") 16, an I/O processor-dedicated local memory (hereinafter referred to as a "local memory"), a DMAC (direct memory access controller) 18, a communication interface (hereinafter referred to as a "communication I/F") 19 for serial communication with the external unit, and a disk I/F 20 which executes processing control for input/output with a disk storage unit 21.

The transfer of a large quantity of data between the exterior of the system and the shared memory 1 and local memory 11 via the communication I/F 19 and disk I/F interface 20 using the I/O processor 15 of the aforementioned kind is executed via the local memory 17 by the action of the I/O CPU 16 and DMAC 18.

By way of example, in a case where four pages of consecutive data is inputted to the shared memory 1 from the disk 21, the I/O CPU 16 sets the initial values of the disk I/F 20 and DMAC 18 and writes the four pages of data from the disk 21 to the local memory 17 through control performed by the DMAC 18. Next, transfer instructions, which are executable instructions, are executed continuously by the I/O CPU 16, whereby the four pages of data are transferred from the local memory 17 to the shared memory 1. As already described, the memory space becomes a continuous area in accordance with access by intermediate real addresses on the common bus. Therefore, the I/O CPU 16 is capable of executing transfer instructions continuously without taking page boundaries into consideration. This illustrates that the DMAC 18 may execute these instructions without the intermediate intervention of the I/O CPU 16.

Furthermore, depending upon the capabilities of the I/O CPU 16 and DMAC 18, it is possible for the communication I/F 19 or disk I/F 20 to execute the transfer of data to the shared memory 1 or local memory 11 without the intervention of the local memory 17.

Therefore, in accordance with this embodiment, even if there is a malfunction in a portion of the shared memory 1 and this portion becomes unusable, the page map em is capable of mapping the intermediate real space without using the malfunctioning portion. As seen from the processor, therefore, the processor is capable of accessing the shared memory 1 while being aware only of its own virtual space. In addition, since memory space can be dealt with continuously by using intermediate real addresses, a large quantity of data from an external unit can be inputted at high speed by DMA (direct memory access) without the intervention of a CPU.

As many apparently widely different embodiments of the present invention can be made without departing from the spirit and scope thereof, it is to be understood that the invention is not limited to the specific embodiments thereof except as defined in the appended claims.

What is claimed is:

1. A processing apparatus in a system in which a plurality of such processing apparatuses are interconnected via a transmission medium, said processing apparatus comprising:

processing means for requesting an access by outputting a virtual address;

local memory means connected to said processing means without an intermediary of the transmission medium;

first address converting means for converting the virtual address from said processing means into a first real address for accessing said local memory means;

second address converting means for converting the virtual address form said processing means into a first intermediate address so that said processing means can access said local memory means included in a different one of said processing apparatuses, and for outputting the first intermediate address to the transmission medium; and third address converting means for converting a second intermediate address brought via the transmission medium to said processing apparatus from another one of said plurality of processing apparatuses, into a second real address for accessing said local memory means, wherein said first and second address converting means receive the same virtual address, and perform respective conversions in parallel, and wherein said first address converting means instructs said second address converting means to stop performing the conversion if an entry corresponding to the virtual address is found in said local memory means during the conversion performed by said first address conversion means.

2. The apparatus according to claim 1, wherein said processing apparatus has a cache memory that is dedicated to said processing apparatus.

3. The apparatus according to claim 1, wherein said system is provided with shared memory means connected to said plurality of processing apparatuses via the transmission medium.

4. The apparatus according to claim 3, wherein said shared memory means is accessed directly by an intermediate address from the transmission medium.

5. The apparatus according to claim 3, wherein said shared memory means is provided with fourth address converting means for converting an intermediate address from the transmission medium into a real address for accessing said shared memory means.

6. The apparatus according to claim 5, wherein said system is provided with input/output control means connected thereto via the transmission medium and being accessed by an intermediate address from said transmission medium.

7. The apparatus according to claim 6, wherein said input/output control means comprises:

first external input/output control means for accessing a large-capacity auxiliary memory medium; and second external input/output control means for implementing access via a communication line.

8. The apparatus according to claim 7, wherein said large-capacity auxiliary memory medium is a disk storage unit.

9. The apparatus according to claim 1, further comprising access-priority control means for controlling an access to said local memory means by providing an access priority for said first address converting means over said third address converting means.

10. A multi-processing system in which a plurality of processing apparatuses are interconnected via a common transmission medium, each of said plurality of processing apparatuses comprising:

processing means for requesting an access by outputting a virtual address;

local memory means connected to said processing means without an intermediary of the transmission medium;

first address converting means for converting the virtual address from said processing means into a first real address for accessing said local memory means;

second address converting means for converting the virtual address from said processing means into a first intermediate address so that said processing means can access said local memory means included in a different one of said plurality of processing apparatuses, and for outputting the first intermediate address to the transmission medium; and third address converting means for converting a second intermediate address brought via the transmission medium to said processing apparatus from another one of said plurality of processing apparatuses, into a second real address for accessing said local memory means, wherein said first and second address converting means receive the same virtual address, and perform respective conversions in parallel, and wherein said first address converting means instructs said second address converting means to stop performing the conversion if an entry corresponding to the virtual address is found in said local memory means during the conversion performed by said first address conversion means.

11. The system according to claim 10, wherein each of said plurality of processing apparatuses has a cache memory that is dedicated to said processing means, respectively.

12. The system according to claim 10, wherein said system is provided with shared memory means connected to said plurality of processing apparatuses via the transmission medium.

13. The system according to claim 12, wherein shared memory means is accessed directly by an intermediate address from the transmission medium.

14. The system according to claim 12, wherein said shared memory means is provided with fourth address converting means for converting an intermediate address from said transmission into a real address for accessing said shared memory means.

15. The system according to claim 12, wherein all intermediate addresses corresponding to real addresses for accessing said local memory means of each of said plurality of processing apparatuses, and accessing to said shared memory means are mapped on a continuous address area.

16. The system according to claim 10, wherein each of said plurality of processing apparatuses further comprises access-priority control means for controlling an access to said local memory means by providing an access-priority for said first address converting means over said third address converting means.

17. The system according to claim 10, wherein all intermediate addresses corresponding to real addresses for accessing said local memory means of each of said plurality of processing apparatuses are mapped on a continuous address area.

* * * * *